(12) United States Patent
Euler et al.

(10) Patent No.: US 8,421,865 B2
(45) Date of Patent: Apr. 16, 2013

(54) METHOD FOR CALIBRATING A VEHICULAR CAMERA SYSTEM

(75) Inventors: Christian Euler, Haibach (DE); Markus Adameck, Roedermark (DE)

(73) Assignee: Magna Electronics Europe GmbH & Co. KG, Holland, MI (US)

( * ) Notice: Subject to any disclaimer, the term of this patent is extended or adjusted under 35 U.S.C. 154(b) by 0 days.

(21) Appl. No.: 13/460,896

(22) Filed: May 1, 2012

(65) Prior Publication Data

US 2012/0224064 A1 Sep. 6, 2012

Related U.S. Application Data

(63) Continuation of application No. 12/604,432, filed on Oct. 23, 2009, now Pat. No. 8,169,480.

(30) Foreign Application Priority Data

Oct. 24, 2008 (DE) .......................... 10 2008 053 047

(51) Int. Cl.
*H04N 7/18* (2006.01)

(52) U.S. Cl.
USPC .......................... 348/148; 348/113; 348/116

(58) Field of Classification Search .............. 348/36–39, 348/113–119, 148
See application file for complete search history.

(56) References Cited

U.S. PATENT DOCUMENTS

| | | | |
|---|---|---|---|
| 3,882,268 A | 5/1975 | Ogawa et al. |
| 4,258,979 A | 3/1981 | Mahin |
| 4,600,913 A | 7/1986 | Caine |
| 4,847,772 A | 7/1989 | Michalopoulos et al. |
| 4,907,870 A | 3/1990 | Brucker |
| 4,931,937 A | 6/1990 | Kakinami et al. |
| 4,942,533 A | 7/1990 | Kakinami et al. |
| 4,970,653 A | 11/1990 | Kenue |
| 4,971,430 A | 11/1990 | Lynas |
| 5,070,454 A | 12/1991 | Griffith |
| 5,097,362 A | 3/1992 | Lynas |
| 5,128,874 A | 7/1992 | Bhanu et al. |
| 5,177,685 A | 1/1993 | Davis et al. |
| 5,189,561 A | 2/1993 | Hong |
| 5,294,991 A | 3/1994 | Oshima et al. |
| 5,304,980 A | 4/1994 | Maekawa |
| 5,333,111 A | 6/1994 | Chaiken et al. |
| 5,355,118 A | 10/1994 | Fukuhara |
| 5,365,603 A | 11/1994 | Karmann |
| 5,369,590 A | 11/1994 | Karasudani |
| 5,424,952 A | 6/1995 | Asayama |

(Continued)

FOREIGN PATENT DOCUMENTS

| | | |
|---|---|---|
| DE | 19962997 | 6/2001 |
| DE | 102006044615 | 3/2008 |

(Continued)

*Primary Examiner* — Andy Rao

(74) *Attorney, Agent, or Firm* — Gardner, Linn, Burkhart & Flory, LLP

(57) ABSTRACT

A method of calibrating a vehicular multi-camera system includes equipping a vehicle with a plurality of cameras wherein each camera of the plurality of cameras captures image data, equipping the vehicle with an image processor, inputting image data from each of the plurality of cameras to the image processor, the image processor processing input image data in order to calibrate the vehicular multi-camera system, and wherein calibration of the vehicular multi-camera system is achieved independently of a model of the real world.

20 Claims, 2 Drawing Sheets

U.S. PATENT DOCUMENTS

| | | | |
|---|---|---|---|
| 5,426,294 A | 6/1995 | Kobayashi et al. | |
| 5,448,484 A | 9/1995 | Bullock et al. | |
| 5,487,116 A | 1/1996 | Nakano et al. | |
| 5,500,766 A | 3/1996 | Stonecypher | |
| 5,521,633 A | 5/1996 | Nakajima et al. | |
| 5,521,843 A | 5/1996 | Hashima et al. | |
| 5,523,811 A | 6/1996 | Wada et al. | |
| 5,530,771 A | 6/1996 | Meakawa | |
| 5,537,003 A | 7/1996 | Bechtel et al. | |
| 5,541,590 A | 7/1996 | Nishio | |
| 5,550,677 A | 8/1996 | Schofield et al. | |
| 5,555,555 A | 9/1996 | Sato et al. | |
| 5,568,190 A | 10/1996 | Noguchi et al. | |
| 5,581,464 A | 12/1996 | Woll et al. | |
| 5,596,365 A | 1/1997 | Erickson et al. | |
| 5,617,085 A | 4/1997 | Tsutsumi et al. | |
| 5,627,586 A | 5/1997 | Yamasaki | |
| 5,638,116 A | 6/1997 | Shimoura et al. | |
| 5,642,093 A | 6/1997 | Kinoshita et al. | |
| 5,642,299 A | 6/1997 | Hardin et al. | |
| 5,668,663 A | 9/1997 | Varaprasad et al. | |
| 5,670,935 A * | 9/1997 | Schofield et al. | 340/461 |
| 5,675,489 A | 10/1997 | Pomerleau | |
| 5,715,093 A | 2/1998 | Schierbeek et al. | |
| 5,724,187 A | 3/1998 | Varaprasad et al. | |
| 5,745,310 A | 4/1998 | Mathieu | |
| 5,760,962 A | 6/1998 | Schofield et al. | |
| 5,786,772 A | 7/1998 | Schofield et al. | |
| 5,790,403 A | 8/1998 | Nakayama | |
| 5,796,094 A | 8/1998 | Schofield et al. | |
| 5,798,575 A | 8/1998 | O'Farrell et al. | |
| 5,837,994 A | 11/1998 | Stam et al. | |
| 5,845,000 A | 12/1998 | Breed et al. | |
| 5,850,254 A | 12/1998 | Takano et al. | |
| 5,877,897 A | 3/1999 | Schofield et al. | |
| 5,884,212 A | 3/1999 | Lion | |
| 5,890,083 A | 3/1999 | Franke et al. | |
| 5,892,855 A | 4/1999 | Kakinami et al. | |
| 5,929,784 A | 7/1999 | Kawaziri et al. | |
| 5,929,786 A | 7/1999 | Schofield et al. | |
| 5,949,331 A | 9/1999 | Schofield et al. | |
| 6,005,492 A | 12/1999 | Tamura et al. | |
| 6,009,377 A | 12/1999 | Hiwatashi | |
| 6,044,321 A | 3/2000 | Nakamura et al. | |
| 6,049,619 A | 4/2000 | Anandan et al. | |
| 6,097,023 A | 8/2000 | Schofield et al. | |
| 6,104,552 A | 8/2000 | Thau et al. | |
| 6,163,083 A | 12/2000 | Kramer et al. | |
| 6,169,940 B1 | 1/2001 | Jitsukata et al. | |
| 6,173,222 B1 | 1/2001 | Seo et al. | |
| 6,201,236 B1 | 3/2001 | Juds | |
| 6,201,642 B1 | 3/2001 | Bos | |
| 6,218,960 B1 | 4/2001 | Ishikawa et al. | |
| 6,222,447 B1 | 4/2001 | Schofield et al. | |
| 6,226,389 B1 | 5/2001 | Lemelson et al. | |
| 6,226,592 B1 | 5/2001 | Luckscheiter et al. | |
| 6,243,003 B1 | 6/2001 | DeLine et al. | |
| 6,246,961 B1 | 6/2001 | Sasaki et al. | |
| 6,249,214 B1 | 6/2001 | Kashiwazaki | |
| 6,250,148 B1 | 6/2001 | Lynam | |
| 6,269,308 B1 | 7/2001 | Kodaka et al. | |
| 6,278,377 B1 | 8/2001 | DeLine et al. | |
| 6,282,483 B1 | 8/2001 | Yano et al. | |
| 6,285,393 B1 | 9/2001 | Shimoura et al. | |
| 6,292,111 B1 | 9/2001 | Ishikawa et al. | |
| 6,292,752 B1 | 9/2001 | Franke et al. | |
| 6,313,454 B1 | 11/2001 | Bos et al. | |
| 6,317,057 B1 | 11/2001 | Lee | |
| 6,320,176 B1 | 11/2001 | Schofield et al. | |
| 6,330,511 B2 | 12/2001 | Ogura et al. | |
| 6,341,523 B2 | 1/2002 | Lynam | |
| 6,353,392 B1 | 3/2002 | Schofield et al. | |
| 6,396,397 B1 | 5/2002 | Bos et al. | |
| 6,411,204 B1 | 6/2002 | Bloomfield et al. | |
| 6,420,975 B1 | 7/2002 | DeLine et al. | |
| 6,433,676 B2 | 8/2002 | DeLine et al. | |
| 6,483,429 B1 | 11/2002 | Yasui et al. | |
| 6,485,155 B1 | 11/2002 | Duroux et al. | |
| 6,498,620 B2 | 12/2002 | Schofield et al. | |
| 6,580,996 B1 | 6/2003 | Freidrich | |
| 6,590,719 B2 | 7/2003 | Bos | |
| 6,594,583 B2 | 7/2003 | Ogura et al. | |
| 6,636,258 B2 | 10/2003 | Strumolo | |
| 6,671,607 B2 | 12/2003 | Ishizu et al. | |
| 6,690,268 B2 | 2/2004 | Schofield et al. | |
| 6,691,008 B2 | 2/2004 | Kondo et al. | |
| 6,708,100 B2 | 3/2004 | Russell et al. | |
| 6,717,610 B1 | 4/2004 | Bos et al. | |
| 6,748,312 B2 | 6/2004 | Russell et al. | |
| 6,757,109 B2 | 6/2004 | Bos | |
| 6,760,471 B1 | 7/2004 | Raymond | |
| 6,819,231 B2 | 11/2004 | Berberich et al. | |
| 6,823,241 B2 | 11/2004 | Shirato et al. | |
| 6,824,281 B2 | 11/2004 | Schofield et al. | |
| 6,882,287 B2 | 4/2005 | Schofield | |
| 6,912,001 B2 | 6/2005 | Okamoto et al. | |
| 6,915,228 B2 | 7/2005 | Uffenkamp et al. | |
| 6,917,378 B2 | 7/2005 | Weis et al. | |
| 6,928,180 B2 | 8/2005 | Stam et al. | |
| 6,941,216 B2 | 9/2005 | Isogai et al. | |
| 6,946,978 B2 | 9/2005 | Schofield | |
| 6,968,266 B2 | 11/2005 | Ahmed-Zaid et al. | |
| 6,989,736 B2 | 1/2006 | Berberich et al. | |
| 7,005,974 B2 | 2/2006 | McMahon et al. | |
| 7,038,577 B2 | 5/2006 | Pawlicki et al. | |
| 7,049,945 B2 | 5/2006 | Breed et al. | |
| 7,058,207 B2 | 6/2006 | Iida et al. | |
| 7,071,964 B1 | 7/2006 | Glatt | |
| 7,088,262 B2 | 8/2006 | Schindler et al. | |
| 7,139,412 B2 | 11/2006 | Kato et al. | |
| 7,145,519 B2 | 12/2006 | Takahashi et al. | |
| 7,151,844 B2 | 12/2006 | Stevenson et al. | |
| 7,161,616 B1 | 1/2007 | Okamoto et al. | |
| 7,188,963 B2 | 3/2007 | Schofield et al. | |
| 7,230,640 B2 | 6/2007 | Regensburger et al. | |
| 7,248,283 B2 | 7/2007 | Takagi et al. | |
| 7,280,124 B2 | 10/2007 | Laufer et al. | |
| 7,295,229 B2 | 11/2007 | Kumata et al. | |
| 7,295,682 B2 | 11/2007 | Otsuka et al. | |
| 7,301,488 B2 | 11/2007 | Leung et al. | |
| 7,317,813 B2 | 1/2008 | Yanagawa et al. | |
| 7,369,940 B2 | 5/2008 | Frank et al. | |
| 7,370,983 B2 | 5/2008 | DeWind et al. | |
| 7,388,475 B2 | 6/2008 | Litkouhi | |
| 7,391,014 B2 | 6/2008 | Saccagno | |
| 7,420,592 B2 | 9/2008 | Freeman | |
| 7,463,138 B2 | 12/2008 | Pawlicki et al. | |
| 7,463,281 B2 | 12/2008 | Luskin et al. | |
| 7,468,745 B2 | 12/2008 | Xin et al. | |
| 7,519,459 B2 | 4/2009 | Ito et al. | |
| 7,526,103 B2 | 4/2009 | Schofield et al. | |
| 7,565,006 B2 | 7/2009 | Stam et al. | |
| 7,592,928 B2 | 9/2009 | Chinomi et al. | |
| 7,663,476 B2 | 2/2010 | Watanabe et al. | |
| 7,680,570 B2 | 3/2010 | Mori | |
| 7,697,029 B2 | 4/2010 | Ozaki | |
| 7,720,580 B2 | 5/2010 | Higgins-Luthman | |
| 7,742,070 B2 | 6/2010 | Glatt | |
| 7,764,808 B2 | 7/2010 | Zhu et al. | |
| 7,768,545 B2 | 8/2010 | Glatt | |
| 7,782,374 B2 | 8/2010 | Suzuki et al. | |
| 7,864,981 B2 | 1/2011 | Leleve et al. | |
| 7,877,175 B2 | 1/2011 | Higgins-Luthman | |
| 7,914,187 B2 | 3/2011 | Higgins-Luthman et al. | |
| 7,925,229 B2 | 4/2011 | Eisenstadt et al. | |
| 7,949,486 B2 | 5/2011 | Denny et al. | |
| 7,991,522 B2 | 8/2011 | Higgins-Luthman | |
| 8,017,898 B2 | 9/2011 | Lu et al. | |
| 8,027,029 B2 | 9/2011 | Lu et al. | |
| 8,116,929 B2 | 2/2012 | Higgins-Luthman | |
| 8,150,210 B2 | 4/2012 | Chen et al. | |
| 8,239,086 B2 | 8/2012 | Higgins-Luthman | |
| 2002/0003571 A1 | 1/2002 | Schofield et al. | |
| 2002/0124260 A1 | 9/2002 | Rivera | |
| 2002/0159270 A1 | 10/2002 | Lynam et al. | |
| 2002/0188392 A1 | 12/2002 | Breed et al. | |
| 2003/0025597 A1 | 2/2003 | Schofield | |

| | | | |
|---|---|---|---|
| 2003/0052773 A1 | 3/2003 | Sjonell | |
| 2003/0156015 A1 | 8/2003 | Winner et al. | |
| 2003/0169522 A1 | 9/2003 | Schofield et al. | |
| 2003/0236622 A1 | 12/2003 | Schofield | |
| 2004/0149504 A1 | 8/2004 | Swoboda et al. | |
| 2005/0232469 A1 | 10/2005 | Schofield et al. | |
| 2006/0050018 A1 | 3/2006 | Hutzel et al. | |
| 2006/0125919 A1 | 6/2006 | Camilleri et al. | |
| 2006/0164230 A1 | 7/2006 | DeWind et al. | |
| 2006/0171704 A1 | 8/2006 | Bingle et al. | |
| 2008/0143835 A1 | 6/2008 | Abe et al. | |
| 2008/144924 A1 | 6/2008 | Hoffmann | |
| 2009/0102292 A1 | 4/2009 | Cook et al. | |
| 2010/0002071 A1 | 1/2010 | Ahiska | |
| 2010/0013930 A1 | 1/2010 | Matsuo et al. | |

FOREIGN PATENT DOCUMENTS

| | | | |
|---|---|---|---|
| EP | 0132151 | A1 | 1/1985 |
| EP | 0354261 | A1 | 2/1990 |
| EP | 0591743 | A1 | 4/1994 |
| EP | 0755524 | B1 | 10/1995 |
| EP | 1710749 | | 10/2006 |
| JP | 01-281600 | | 11/1989 |
| JP | 03-097080 | | 4/1991 |
| JP | 03-203000 | | 9/1991 |
| JP | 05-062099 | | 3/1993 |
| JP | 2003-087781 | | 3/2003 |
| JP | 2003-329439 | | 11/2003 |
| JP | 2005-039599 | | 2/2005 |
| WO | WO 2007/049266 | | 5/2007 |
| WO | WO 2010/038224 | | 4/2010 |

* cited by examiner

METHOD FOR CALIBRATING A VEHICULAR CAMERA SYSTEM

This application is a continuation of U.S. patent application Ser. No. 12/604,432, filed Oct. 23, 2009, now U.S. Pat. No. 8,169,480, which claims the benefits of German Application No. 102008053047.6, filed Oct. 24, 2008.

FIELD OF THE INVENTION

The present invention relates to a method for automatically calibrating a virtual camera and to a virtual camera apparatus which is set up for carrying out the method according to the invention. In particular, the present invention relates to a virtual camera for producing a view of the surroundings of a motor vehicle from a bird's eye perspective on a motor vehicle.

BACKGROUND OF THE INVENTION

What is known as a virtual camera refers to sets comprising a real recording camera and a habitually electronic image data processing device, which produce an output signal with a coded image or a coded image sequence, wherein the perspective of the coded images does not match the perspective of the recording camera. On account of the loss of information when a real three-dimensional object is mapped into a two-dimensional image data model by a real recording camera, the virtual camera is able to reproduce non-moving objects correctly particularly when they are approximately flat.

Virtual cameras have been proposed as driver assistance devices in motor vehicles. These are particularly what are known as top view systems or omnidirectional cameras. These typically comprise a plurality of real recording cameras which are arranged in or on a vehicle and which are used to produce a chronological sequence of image data records. The image data in the image data records are subjected to different transformations in a typically electronic image data processing device and are mixed to form a chronological sequence of overall image data. This makes it possible to obtain, by way of example, a view of the surroundings of the vehicle from a perspective above the vehicle roof. This chronological sequence of overall image data can be continuously displayed to the driver of the motor vehicle on a display apparatus in order to simplify shunt or parking manoeuvres.

It is evident that in a virtual camera with a plurality of real recording cameras the quality of the overall image delivered is distinctly dependent on the exact knowledge of the positions and directions of the real recording cameras. The more accurately that these data are known, the easier that it is possible to determine the transformation that determines the best possible image quality in the area of adjacent recording areas. Against this background, there have been a series of proposals involving either the automatic determination of the positions and directions of the recording cameras or the correction of errors in these variables in relation to initially stored values.

An omnidirectional camera with automatic calibration is revealed by the officially published document DE 10 2007 043 905 A1. Said document proposes identifying an object element in the image data for the purpose of the calibration. The recognition of mapped areas of the outer vehicle skin is recognized as particularly advantageous. The proposed approach is intended to allow compensation for, inter alia, situational changes in the real recording cameras on the vehicle on account of vibrations, ageing and thermal or mechanical stresses.

However, the known method is based on the processing of information from a model of the real world and particularly on the processing of information regarding the shape of the outer vehicle skin.

SUMMARY OF THE INVENTION

Against this background, the present invention is based on the object of providing a method for the automatic calibrating of a virtual camera which manages independently of a model of the real world.

This object is achieved by the present invention by means of a method having the features specified in claim 1.

Advantageous refinements and developments of the method according to the invention are specified in the subclaims.

BRIEF DESCRIPTION OF THE DRAWINGS

A preferred manner of carrying out the method according to the invention and a virtual camera apparatus which is set up to do so are described below, reference being made to the appended drawings, in which.

DETAILED DESCRIPTION OF THE INVENTION

Figure 1:
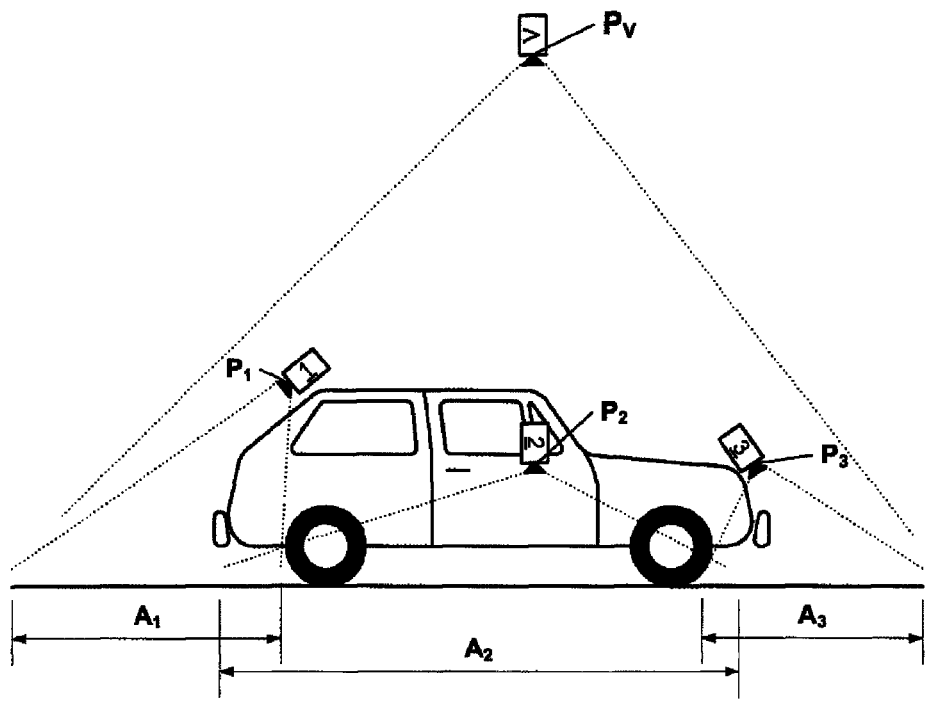
FIG. 1 shows a schematic illustration of a typical arrangement of real recording cameras on a motor vehicle and of the situation of the virtual perspective.

As FIG. 1 shows, an expedient apparatus for carrying out a preferred method according to the invention for a driver assistance system on a motor vehicle first of all comprises a plurality of real recording camera devices 1, 2, 3. A fourth recording camera device 4 is located in the area which cannot be seen on the opposite side of the vehicle from the recording camera device 2. In one expedient implementation, the real recording camera devices 1, 2, 3, 4 are in the form of a CCD or CMOS array with a wide-angle or fisheye lens in a manner which is known per se and are arranged at different points on the motor vehicle 4 behind the glazing and in suitable pockets on the exterior mirrors. In the fitting positions which are possible in practice, the real perspectives $P_{1...4}$ of the real recording camera devices 1, 2, 3, 4 are naturally offset and/or tilted with respect to the virtual perspective $P_v$, that is to say the viewing point of the virtual viewer. The greater that the difference between the real perspective $P_{1...4}$ of a real recording camera device 1, 2, 3, 4 and the virtual perspective $P_v$ turns out to be, the worse the quality of the image data with the transformed perspective under realistic conditions. This will be discussed later. Conversely, some fields of vision would not be visible to a viewer with a perspective corresponding to the virtual perspective $P_v$, because they are situated behind portions of the outer vehicle skin. In this respect, the selection of the camera positions is a trade-off between these advantages and disadvantages.

Figure 2:
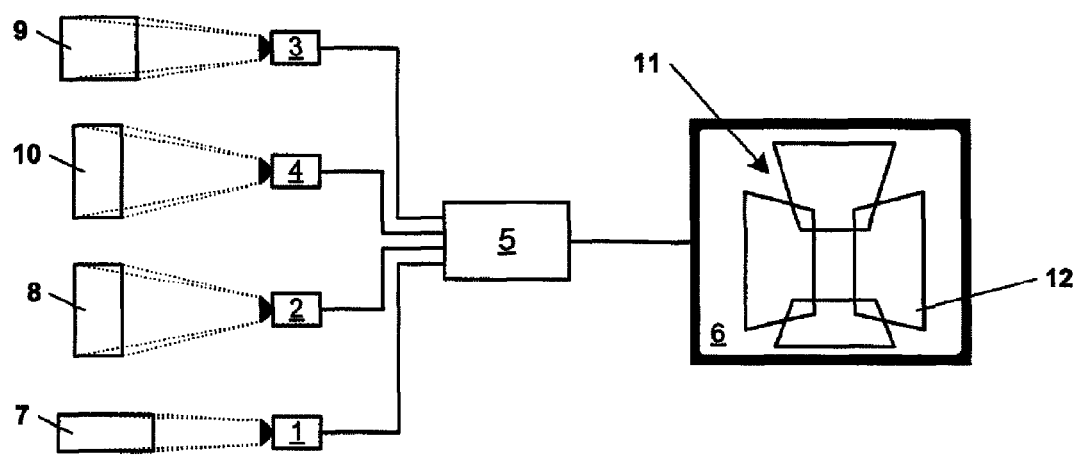
FIG. 2 shows a schematic illustration of the functional units and data streams in a preferred apparatus for carrying out a method according to the invention.

As further components, the apparatus described which is shown in FIG. 2 comprises an image data processing device 5 and a display device 6. In this case, the display device 6 is typically arranged in the area of the instrument panel or the central console. In a typical implementation, the image data processing device 5 is a digital signal processor or a powerful microprocessor for general applications with adequate equipment in terms of main memory and non-volatile program memory.

Figure 3:
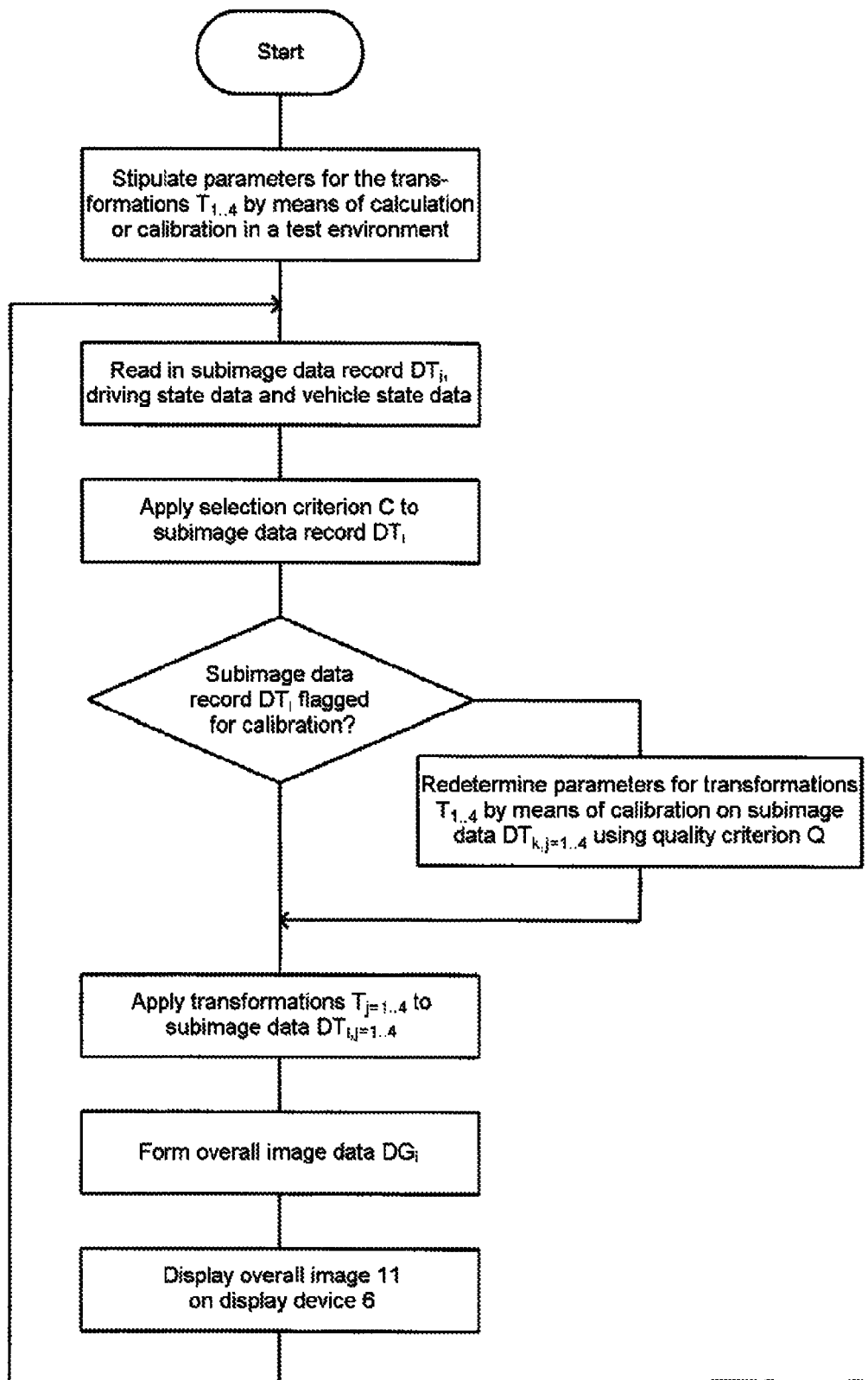
FIG. 3 shows a schematic synopsis of an algorithm for implementing a method according to the invention.

In line with the schematic illustration of a preferred algorithmic implementation of the method according to the invention which is shown in FIG. 3, the real recording camera devices 1, 2, 3, 4 respectively deliver a chronological sequence of N×4 raw subimage data items $DR_{1...N, 1...4}$ to the image data processing device 5 in the operating period under consideration. Said image data processing device combines the data streams to form a chronological sequence of subimage data records $DR_{1...N}$. Each subimage data record $DR_i$ in the sequence contains the subimage data $DR_{i, 1...4}$ from the real recording camera devices 1, 2, 3, 4. In the image data processing device 5, a respective transformation $T_{1...4}$ is applied to the subimage data $DR_{i, 1...4}$ which a subimage data record $DR_i$ contains when it is present. These transformations $T_{1...4}$ are respectively determined such that the relevant image 7, 8, 9, 10 of a predetermined planar mapping area $A_j$ of the real recording camera device j with the perspective $P_j$ is transformed into the image from the virtual camera with the perspective $P_v$. For the case of an ideal recording camera device, this transformation would be linear and could be compiled from a planar perspective extension of the image by means of rotation and displacement. In comparison with the aforementioned ideal recording camera device, however, the real recording camera devices 1, 2, 3, 4 deliver maps with nonlinear distortions. The primary cause of these nonlinear distortions is inadequacies in the real mapping lenses. This relates particularly distinctly to the proposed lenses with a strong wide-angle or fisheye characteristic. From this point of view, positions for the real recording camera devices 1, 2, 3, 4 which are further away from the road are naturally preferable. However, the nonlinear distortions can usually be attributed to a satisfactory measure for observation of the environment using what are known as inverse nonlinear transformations, which are known per se. Consequently, a person skilled in the art will, according to the respective situation, select a chain comprising a nonlinear transformation for the purpose of equalization and an ideal perspective extension for the described transformation $T_{1...4}$. The application of the transformations $T_{1...4}$ to the subimage data $DR_{i, 1...4}$ results in transformed subimage data $DT_{i, 1...4}$. In the present case, it is assumed that the transformations $T_{1...4}$ transform the subimage data $DT_{i, 1...4}$ directly into the coordinate system of the overall image 11. Accordingly, the overall image data $DG_i$ can be produced by simply combining the data from the transformed subimage data $DT_{i, 1...4}$.

Since, in the ideal case described, the positions and recording directions of the recording camera devices 1, 2, 3, 4 did not change, the information about the orientation and situation of the subimages in the overall image would need to be set only once for the relevant vehicle geometry as a parameter for the transformations $T_{1...4}$ prior to startup. In the course of such initial calibration, the parameters can be determined either by calculating or calibrating the apparatus on a test bench. Even with optimum initial calibration, ambiguities can arise in the area of the overlaps 12 in the subimages 7, 8, 9, 10 on account of the described nonlinear distortions in the real recording camera devices 1, 2, 3, 4. Through suitable selection of the transformations and/or expedient stipulation of the subimage boundaries, however, it is possible to attain entirely satisfactory results in practice. In this regard, an appropriately adjusted image data processing device 5 produces as an output signal a sequence of overall image data $DG_{1...N}$ which are displayed in their chronological order on a display device 6 and give the driver an impression of the immediate surroundings of the motor vehicle.

Effects of ageing, overloads, accidents and the like may result in the position and/or orientation of the recording camera devices 1, 2, 3, 4 being changed. If such a change is followed by the subimages continuing to be assembled to form an overall image in the originally stipulated manner, the result is poorer quality for the overall image. To counteract this drawback, the image data processing device 5 recurrently performs calibration with the aim of optimization using a prescribed quality criterion Q for the overall image. In this case, the quality criterion Q is a scalar value which is dependent on the data from the subimages and on the stored information relating to the positions and directions of the real recording camera device 1, 2, 3, 4. Expediently, the quality criterion Q is stipulated such that it reflects the quality of the overall image, as subjectively perceived by an average viewer. In one advantageous refinement, the quality criterion Q will also relate to the correlations of the subimages 7, 8, 9, 10 in the areas of overlap 12. The quality criterion Q is optimized for a firmly prescribed subimage data record $DR_i$ by varying the parameters of the transformations. The parameters varied to the optimum replace the values originally stored in the apparatus for the purpose of further operation of the apparatus.

This calibration is recurrently performed over time whenever a selection criterion C flags a subimage data record $DR_k$ for this purpose. In the present case, the selection criterion C is defined such that the flagged subimage data record $DR_k$ means that the calibration provides the best possible result. Intuitively, a good result will be assumed if the application of the quality criterion Q to the overall images 11 which follow the calibration provides the best possible result overall. Since the quality criterion Q in the present case relates only to an individual image data record, the quality of a sequence naturally requires appropriate definition. To this end, it is possible to use the generally known statistical functions, such as the mean value. Expediently, the selection criterion C processes the subimage data $DR_{k, 1...4}$ anyway in order to assess the suitability of the flagged subimage data record $DR_k$ for the calibration. This complies with the insight that not all subimage data records $DR_i$ are equally good for the calibration in practice. By way of example, calibration must obviously remain undone in the event of a lack of contrast, under exposure, defocusing or motion blurring. Equally disadvantageous are image data records with periodic structures, which can be recognized by means of frequency analysis of the subimage data $DR_{k, 1...4}$, for example. In addition, the subimage data $DR_{k, 1...4}$ can be examined to determine whether they contain maps of three-dimensional objects above the road level. Typical objects of this kind are high kerbstones, crash barriers, marker posts, for example. A subimage data record $DR_i$ with maps of such objects in the area of the overlaps 12 should not be used for the calibration.

In addition, the selection criterion C flags a subimage data record $DR_k$ for calibration only if there was a particular state of the motor vehicle at the time at which said subimage data record was recorded, and the driving situation was within prescribed limits at this moment. To this end, the image data processing device 5 also derives, collects and assesses vehicle state variables and driving state variables from detection devices on the motor vehicle. In this context, preferred vehicle state variables are the operating period and mileage of the vehicle, the number of vehicle starts and the operating period and also the mileage since the vehicle was last started. By including these variables in the selection criterion C, it is particularly possible to take account of thermal changes, mechanical settling or ageing effects and wear. Preferred driving state variables selected are the speed of travel, the acceleration, the steering angle, the angle of inclination and the loading of the vehicle. If available, it is also possible to include data about the tyre pressure and the setting of the suspension. When these data are included, it is possible to take account of the dynamic differences in the vehicle situation in relation to the road surface when deciding about calibration.

Further preferred variables for inclusion in the selection criterion C could be the GPS position of the vehicle, the exterior light conditions and signals from proximity sensors for the near field of the vehicle. By including such variables, it is possible to base the decision about calibration on considerations concerning whether and to what extent the current vehicle surroundings favour or impede calibration.

On the basis of a subimage data record $DR_k$ flagged by the selection criterion C, the calibration can preferably be performed by calculating a correlation between the subimage data $DT_{i, 1 \ldots 4}$ in a manner which is known per se. In this case, the areas of overlap 12 are identified and the situation and orientation of the image sections coded in the subimage data $DT_{i, 1 \ldots 4}$ relative to one another are determined. The quality criterion Q is optimized for the flagged subimage data record $DR_k$ by varying the parameters of the transformations $T_{1 \ldots 4}$.

In one refinement of the method described above, it is also possible to include the history of the calibrations performed in the past in the selection criterion. For example, this history could be used to determine the time for the next calibration. It is also possible to determine the parameters of the transformations not exclusively on the basis of the result of the last calibration, but rather to perform historical averaging. Yet another option is to anticipate adaptation of the parameters without calibration by extrapolation on the basis of the already collected historical data from past calibrations.

We claim:

1. A method of calibrating a vehicular multi-camera system, said method comprising:
   equipping a vehicle with a plurality of cameras wherein each camera of said plurality of cameras captures image data;
   wherein said plurality of cameras comprises a first camera mounted at a forward portion of the vehicle and having a field of view that includes a ground surface forward of the vehicle, a second camera mounted at a rearward portion of the vehicle and having a field of view that includes a ground surface rearward of the vehicle, a third camera mounted at a sideward portion of the vehicle and having a field of view that includes a ground surface sideward of the vehicle at one side of the vehicle, and a fourth camera mounted at another sideward portion of the vehicle and having a field of view that includes a ground surface sideward of the vehicle at the other side of the vehicle;
   equipping said vehicle with an image processor;
   inputting image data from each of said plurality of cameras to said image processor;
   said image processor processing input image data in order to calibrate said vehicular multi-camera system;
   wherein calibration of said vehicular multi-camera system is achieved independently of a model of the real world;
   producing a chronological sequence of image data by recurrently applying a selection criterion to select from a sequence of subimage data records recorded by said first, second, third and fourth cameras;
   determining parameters of transformations of said subimage data records via an optimization method that uses a quality criterion for an overall image; and
   assembling a sequence of transformed subimage data records to form a sequence of overall image data.

2. The method of claim 1, wherein equipping a vehicle with a plurality of cameras comprises equipping a vehicle with a plurality of CMOS cameras.

3. The method of claim 1, wherein calibration of said vehicular multi-camera system is achieved independently of the shape of the outer vehicle skin.

4. The method of claim 1, comprising an initial calibration before producing a chronological sequence of image data.

5. The method of claim 1, wherein said quality criterion comprises a scalar value.

6. The method of claim 5, wherein said scalar value is dependent on said subimage data.

7. The method of claim 6, wherein said scalar value is dependent on stored information relating to at least one of (i) a position of at least one of said first, second, third and fourth cameras and (ii) a direction of said field of view of at least one of said first, second, third and fourth cameras.

8. The method of claim 6, wherein said scalar value is dependent on stored information relating to (i) a position of at least one of said first, second, third and fourth cameras and (ii) a direction of said field of view of at least one of said first, second, third and fourth cameras.

9. The method of claim 6, wherein said scalar value is dependent on stored information relating to at least one of (i) respective positions of said first, second, third and fourth cameras and (ii) respective directions of said fields of view of said first, second, third and fourth cameras.

10. The method of claim 1, wherein said quality criterion reflects a quality of said overall image data.

11. The method of claim 1, wherein said calibration is recurrently performed over time in response to said selection criterion selecting a particular subimage data record.

12. The method of claim 11, wherein said selection criterion selects a particular subimage data record when a particular state of the vehicle at the time at which said particular subimage data record was recorded is within a prescribed limit.

13. A method of calibrating a vehicular multi-camera system, said method comprising:
   equipping a vehicle with a plurality of CMOS cameras wherein each camera of said plurality of CMOS cameras captures image data;
   wherein said plurality of CMOS cameras comprises a first camera mounted at a forward portion of the vehicle and having a field of view that includes a ground surface forward of the vehicle, a second camera mounted at a rearward portion of the vehicle and having a field of view that includes a ground surface rearward of the vehicle, a third camera mounted at a sideward portion of the vehicle and having a field of view that includes a ground surface sideward of the vehicle at one side of the vehicle, and a fourth camera mounted at another sideward portion of the vehicle and having a field of view that includes a ground surface sideward of the vehicle at the other side of the vehicle;
   equipping said vehicle with an image processor;
   inputting image data from each of said plurality of cameras to said image processor;
   said image processor processing input image data in order to calibrate said vehicular multi-camera system;
   wherein calibration of said vehicular multi-camera system is achieved independently of a model of the real world, and wherein calibration of said vehicular multi-camera system is achieved independently of the shape of the outer vehicle skin;

producing a chronological sequence of image data by recurrently applying a selection criterion to select from a sequence of subimage data records recorded by said first, second, third and fourth cameras;

determining parameters of transformations of said subimage data records via an optimization method that uses a quality criterion for an overall image; and assembling a sequence of transformed subimage data records to form a sequence of overall image data.

14. The method of claim 13, comprising an initial calibration before producing a chronological sequence of image data.

15. The method of claim 13, wherein said quality criterion comprises a scalar value, and wherein said scalar value is dependent on stored information relating to at least one of (i) a position of at least one of said first, second, third and fourth cameras and (ii) a direction of said field of view of at least one of said first, second, third and fourth cameras.

16. The method of claim 13, wherein said calibration is recurrently performed over time in response to said selection criterion selecting a particular subimage data record, and wherein said selection criterion selects a particular subimage data record when a particular state of the vehicle at the time at which said particular subimage data record was recorded is within a prescribed limit.

17. A method of calibrating a vehicular multi-camera system, said method comprising:

equipping a vehicle with a plurality of CMOS cameras wherein each camera of said plurality of CMOS cameras captures image data;

wherein said plurality of CMOS cameras comprises a first camera mounted at a forward portion of the vehicle and having a field of view that includes a ground surface forward of the vehicle, a second camera mounted at a rearward portion of the vehicle and having a field of view that includes a ground surface rearward of the vehicle, a third camera mounted at a sideward portion of the vehicle and having a field of view that includes a ground surface sideward of the vehicle at one side of the vehicle, and a fourth camera mounted at another sideward portion of the vehicle and having a field of view that includes a ground surface sideward of the vehicle at the other side of the vehicle;

equipping said vehicle with an image processor;

inputting image data from each of said plurality of cameras to said image processor;

said image processor processing input image data in order to calibrate said vehicular multi-camera system;

wherein calibration of said vehicular multi-camera system is achieved independently of a model of the real world;

producing a chronological sequence of image data by recurrently applying a selection criterion to select from a sequence of subimage data records recorded by said first, second, third and fourth cameras;

determining parameters of transformations of said subimage data records via an optimization method that uses a quality criterion for an overall image;

assembling a sequence of transformed subimage data records to form a sequence of overall image data; and initially calibrating said vehicular multi-camera system before producing a chronological sequence of image data.

18. The method of claim 17, comprising an initial calibration before producing a chronological sequence of image data.

19. The method of claim 17, wherein said quality criterion comprises a scalar value, and wherein said scalar value is dependent on stored information relating to at least one of (i) a position of at least one of said first, second, third and fourth cameras and (ii) a direction of said field of view of at least one of said first, second, third and fourth cameras.

20. The method of claim 17, wherein said calibration is recurrently performed over time in response to said selection criterion selecting a particular subimage data record, and wherein said selection criterion selects a particular subimage data record when a particular state of the vehicle at the time at which said particular subimage data record was recorded is within a prescribed limit.

* * * * *